W. L. PAUL.
PLOW.
APPLICATION FILED JUNE 11, 1910.
1,025,829.
Patented May 7, 1912.
2 SHEETS—SHEET 1.
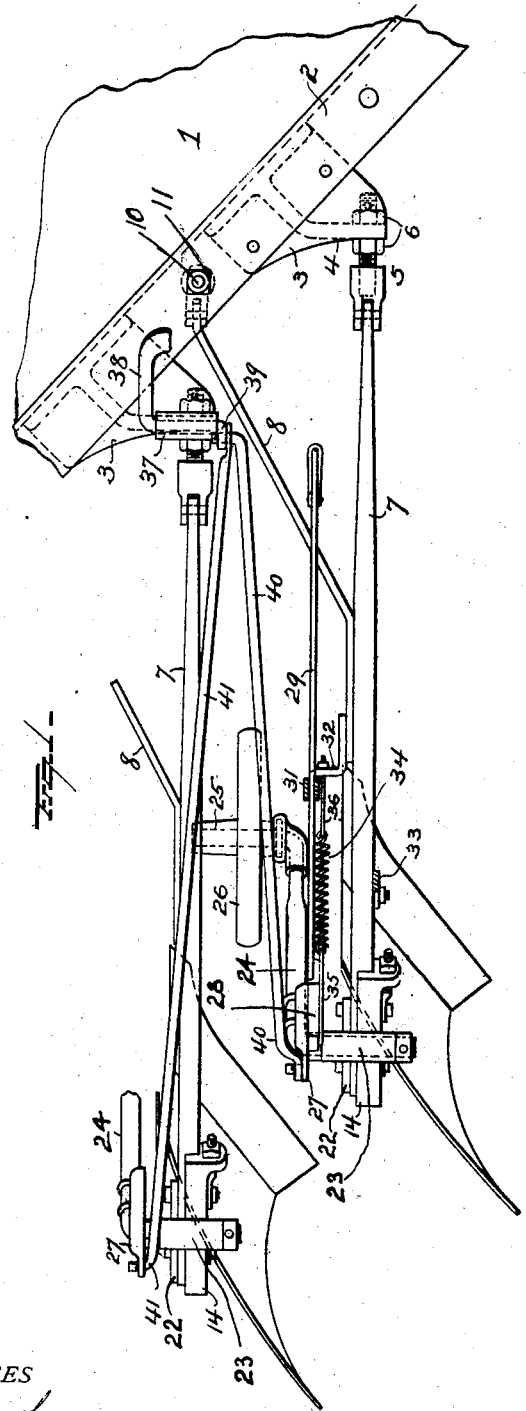
WITNESSES
INVENTOR
Attorney

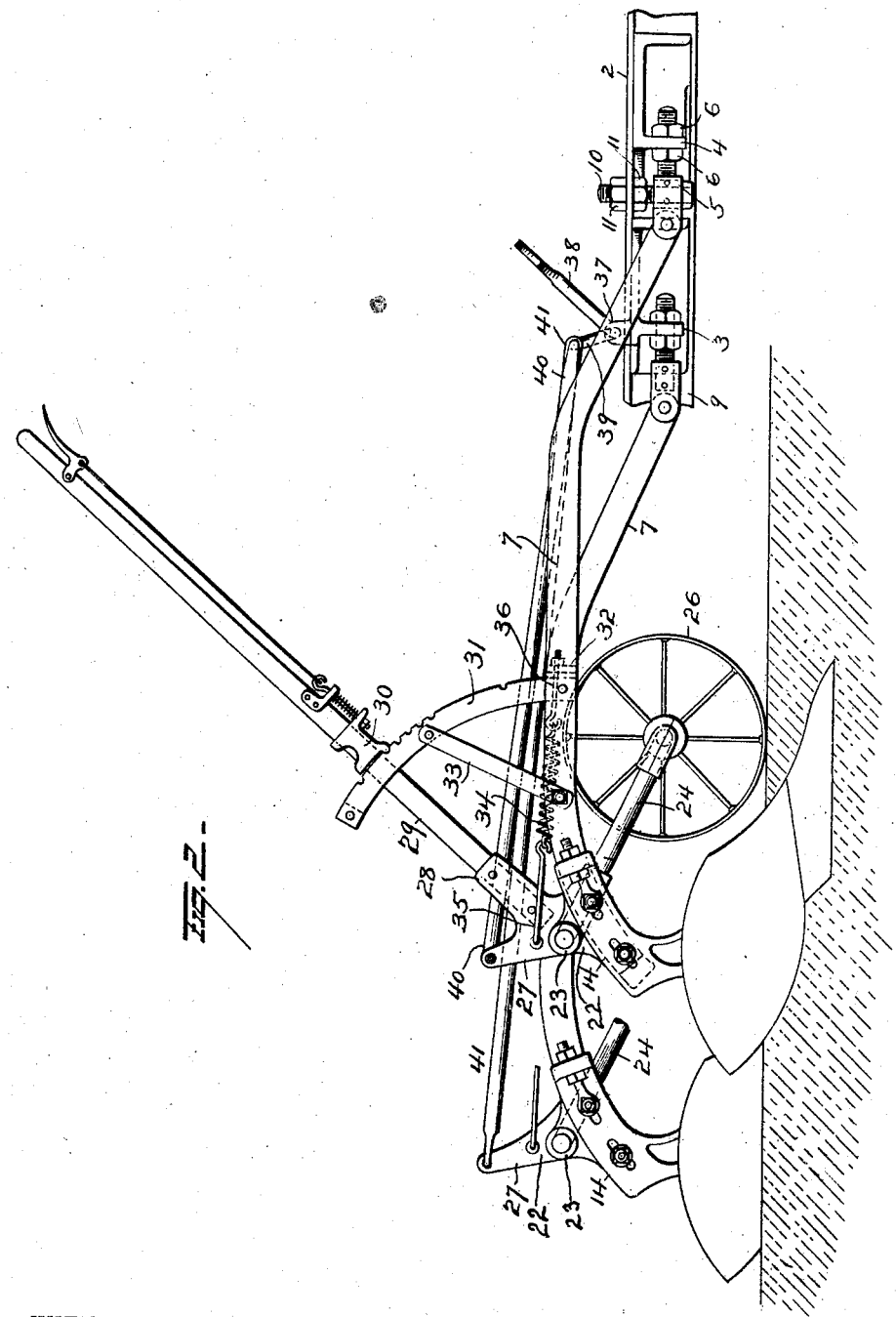

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

PLOW.

1,025,829.  Specification of Letters Patent.  Patented May 7, 1912.

Application filed June 11, 1910. Serial No. 566,417.

*To all whom it may concern:*

Be it known that I, WILLIAM L. PAUL, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to that class known in the trade as engine gang plows.

There are two types of engine gang plows now in use; one in which the several plows are separately connected with the truck frame and each provided with means for raising them independently of the others,—while the other type employ plows coupled in pairs, means being provided for raising each pair of plows simultaneously. When the several plows are mounted independently of each other, the plow will readily adapt itself to uneven ground, but such construction, necessitating lifting means for each plow, will require considerable time in manipulating the plows. In plow structures in which the plows are coupled and operable in pairs, the plow will not so readily adapt itself to the unevenness of the ground and when one of the coupled pair of plows meets an obstruction or raised place on the ground, both plows of the pair will be raised and one of them, moving in a different arc from the other, would be liable to be raised higher than necessary and possibly entirely out of the ground.

One object of my present invention is to combine the advantageous features of both types of gang plows above referred to without encountering the disadvantages of either.

A further object is to provide a gang plow of the type specified with foot operating means constructed and adapted to assist hand operated means in the raising of the plows.

A further object is to so construct a gang plow of the type mentioned, that the plows can be raised in pairs or in series and yet permit the plows to rise and fall individually so that each plow can adapt itself to the condition of the ground without affecting any other plow or plows of the series.

With these objects in view the invention consists in certain novel features of construction and combinations of parts as hereinafter set forth and pointed out in the claims.

In the accompanying drawings, Figure 1 is a plan view of a portion of a gang plow embodying my improvements, and Fig. 2 is a side elevation of the same.

1 represents a portion of a truck frame such as commonly employed with engine gang plows and provided with a diagonal rear edge to which a angle beam 2 is secured. Brackets 3 are secured at intervals to the angle beam 2 and each bracket is provided with a vertical flange 4. The threaded member of a knuckle 5 is passed through a suitable hole in the flange 4 and held adjustably in position by means of nuts 6. The forward end of a plow beam 7 is pivotally connected with the rear end of each knuckle 5 in such manner as to permit vertical movement of the rear end of said plow beam. A laterally projecting brace 8 is secured to an intermediate portion of each plow beam and at its forward end said brace is pivotally connected to a vertically adjustable knuckle 10,—the threaded member of which latter passes through one of the flanges of the angle beam 2 and adjustably secured thereto by means of nuts 11.

A soil engaging member is provided at the rear end of each plow beam and connected with the latter through the medium of a suitable standard 14.

A bracket 22 is secured to each plow beam 7 at or near the rear end thereof and provided with a bearing sleeve 23 for one member of a Z-shaped axle 24. The downwardly and forwardly projecting member of the axle 24 is provided at its forward end with a laterally projecting member 25 which constitutes a spindle upon which a wheel 26 is mounted,—said wheel being thus disposed laterally from the landside of the soil engaging member and adapted to engage the ground rearwardly of the point of said soil engaging member.

An arm 27 is secured to each axle 24 and the arms 27 on the axles on alternate plows are provided with socketed members 28, each adapted for the reception of a hand lever 29. Each hand-lever 29 is provided with a spring pressed detent 30 to coöperate with a notched segment 31, the latter being secured at one end to a bracket 32 on the plow beam and maintained rigid by means of a brace 33 secured at its upper end to an intermediate portion of said toothed segment and at its lower end to the plow beam.

It is apparent that by moving the lever 29 downwardly from the position shown in Fig. 2, the Z-shaped axle will be turned and pressure applied to the wheel 26, thus raising the plow beam on its pivotal connection with the truck 1 and elevating the soil engaging member.

In order to assist in raising the plow, a spring 34 may be employed,—one end of said spring being connected through the medium of a rod 35 with the arm 27 and the other end of said spring being connected by means of a rod 36 with the bracket 32.

The operating devices above described are connected with one plow of a pair or series of plows. Upon the bracket 3 to which the next plow of the pair is connected, is provided a bearing 37 for a foot lever 38,—with the arm 39 of which, one end of a rod 40 is pivotally attached and the other end of said rod is connected with the arm 27 on the axle 24 of the first plow of the pair. A rod 41 is also connected at its forward end to the arm 39 of the foot-lever 38, and at its other end this rod 41 is connected with the arm 27 secured to the axle 24 on the second plow beam of the pair. It will be seen that the construction and arrangement of the devices at the rear end of the second plow of the pair are the same as above described in connection with the first plow, except that the arm 27 on the second plow is not provided with the member 28 for the connection of a hand lever, although if desired such hand lever may be connected with the raising devices for each plow of the series.

From the construction and arrangement of parts above described and as shown in Fig. 1 of the drawings, it will be apparent that when the hand-lever 29 is operated, the first plow of the pair of plows will be raised and motion will be transmitted through the rods 40 and 41, and the foot lever 38 to the raising devices on the second plow of the pair and thus the two plows may be raised simultaneously, the pressure of the foot of the operator upon the foot-lever 38 will very materially assist in raising the pair of plows simultaneously.

While I have provided means whereby the plows may be raised in pairs, still the construction is such (with sufficient play or looseness in the connections of the rods 40, 41) that the plows can yield individually upon meeting obstructions and thus the rising of one plow will in no way affect the position or the work of any other plow of the series.

Having fully described my invention what I claim as new and desire to secure by Letters-Patent, is,—

1. In a plow structure of the character described, the combination with a traveling member and a plurality of plows pivotally connected therewith, of a foot lever, raising devices for each plow, and connections between said foot lever and the raising devices of two adjacent plows.

2. In a plow structure of the character described, the combination with a traveling member and a pair of plow beams having pivotal connection at their forward ends with the traveling member, of lifting devices for each of said plows, a hand lever connected with the lifting devices of one plow, a foot lever connected with the lifting devices of the other plow, and a connection between said foot lever and the lifting devices of the first plow whereby the two plows can be lifted simultaneously by combined hand and foot power.

3. In a plow structure of the character described, the combination with a traveling member and a pair of plows pivotally connected at their forward ends with said traveling member, of a Z-shaped axle mounted at the rear end of each plow beam and having a laterally projecting spindle at the forward end of its forwardly projecting member, a wheel mounted on the spindle of each axle, an arm secured to each axle, a hand lever secured to the arm on one axle, a foot lever, and rods connecting said foot lever with the arms on the axles of the two adjacent plows.

In testimony whereof, I have signed this specification in the presence of two subscribing witnesses.

WILLIAM L. PAUL.

Witnesses.
 EDWIN NICAR,
 THOS. A. FREEMAN.

---

Copies of this patent may be obtained for five cents each, by addressing the "Commissioner of Patents, Washington, D. C."